May 13, 1930. J. A. COWLEY 1,758,688
TESTING MACHINE
Filed June 18, 1928.
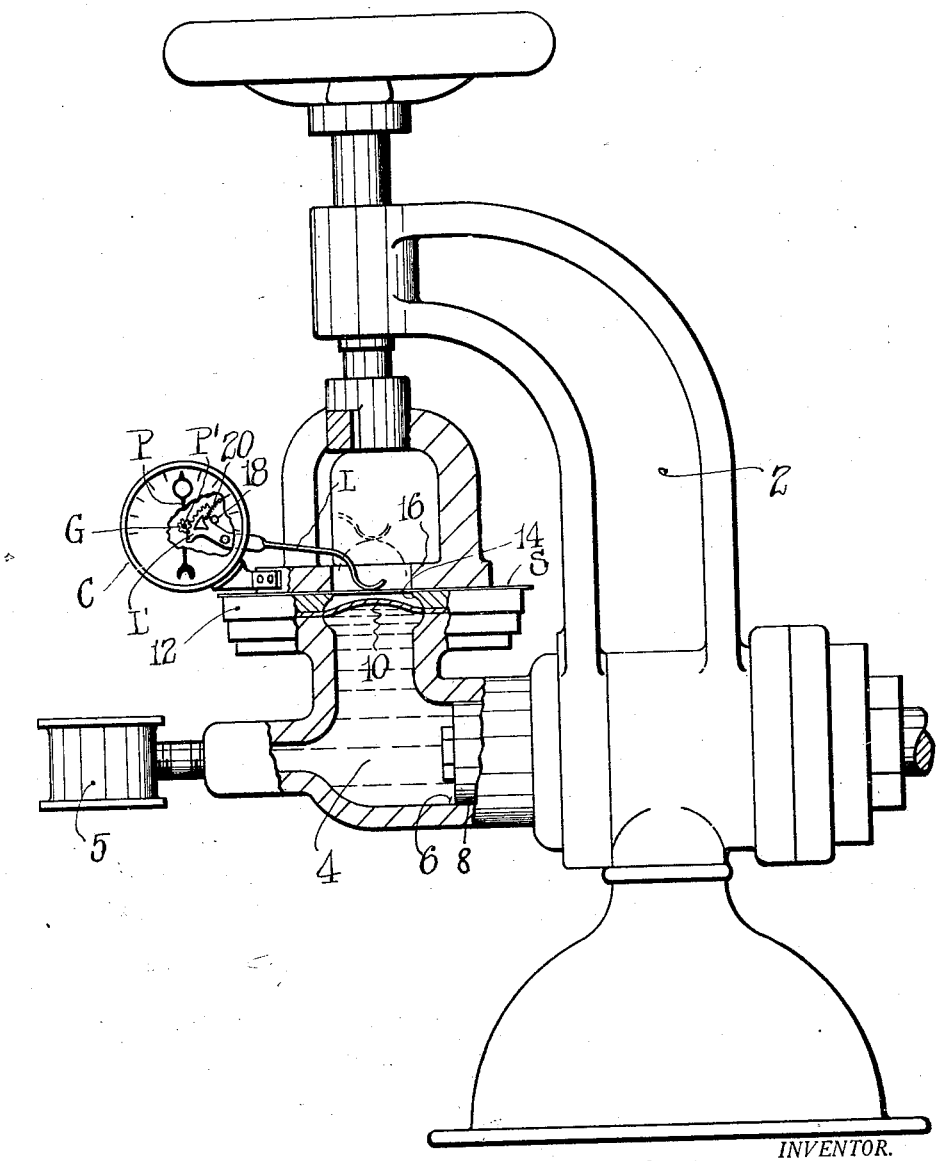
INVENTOR.
James A Cowley
BY Walter C Ross
his ATTORNEYS.

Patented May 13, 1930

1,758,688

UNITED STATES PATENT OFFICE

JAMES A. COWLEY, OF SPRINGFIELD, MASSACHUSETTS, ASSIGNOR TO B. F. PERKINS & SON, INC., OF HOLYOKE, MASSACHUSETTS, A CORPORATION OF MASSACHUSETTS

TESTING MACHINE

Application filed June 18, 1928. Serial No. 286,278.

This invention relates to improvements in testing machines and is directed particularly to apparatus for indicating the elongation or stretchability of materials such as paper, fabric or the like.

A machine known as a "Mullen" tester is in common use for testing the tensile strength of paper, films, fabric and the like and comprises generally an apertured specimen support and clamp for holding a specimen and a yieldable diaphragm which is distended by fluid pressure to distend and rupture the specimen. This "Mullen" tester has become a recognized standard for testing paper.

During the testing operation the specimen is of course elongated or stretched and not only is the ability of the paper to withstand the pressure an important consideration but in connection with films of cellulose, paints or the like it is desired to determine the amount of elongation or stretch of the specimen which has taken place up to the time of the rupture.

Accordingly the principal object of the invention is the provision of means, which is adapted for use in connection with a testing machine for indicating the amount of elongation of a specimen while it is being distended by the testing machine.

The invention is adapted for broad application but for purposes of disclosure is shown and described in connection with a "Mullen" tester this being one form of machine for which the preferred form of the invention is adapted.

The drawing is a partial elevational view of a "Mullen" tester with the novel features of the apparatus of my invention associated therewith, certain of the parts being broken away for clearness.

Referring now to the drawings in detail. 2 represents a frame or body which has a fluid chamber 4 in communication with a bore 6 in which is located a piston 8. A yieldable diaphragm 10 at the upper side of the chamber underlies a specimen supporting table 12 which is provided with an aperture 14 while a movable ring-like clamping member 16 is provided above the platform for clamping a specimen S between it and the platform. As the piston 8 is moved towards the chamber the fluid therein is caused to act on or distend the diaphragm and likewise the specimen until the specimen is ruptured. The pressure of the fluid at the time of rupture is indicated by a gauge 5 which indication is used to designate the tensile strength of the specimen. The apparatus is thus only briefly described as it is well disclosed in a patent to Cleveland, dated April 30, 1920, and numbered 1,025,110.

The novel combination and arrangement of parts for indicating the elongations of the specimen will now be described. An indicator casing C is secured to the movable clamping member 16 and has a lever L pivoted therein that is formed with a curved outer end which passes through the aperture of the clamp so as to lie upon the specimen S and is elevated thereby as the specimen is distended by the diaphragm. The lever L is connected to and arranged to actuate a pointer P rotatably mounted in the indicator casing and for that purpose may be provided with a gear segment L' which meshes with and rotates a pinion gear G of a shaft P' of the pointer. A dial or scale is disposed below the pointer and may carry such designations as may be desired and with which the pointer may register as it is rotated by the lever to thereby indicate various degrees of elongation of the specimen.

A stop 18 provided in the casing serves to limit the movement of the lever and pointer and a spring 20 connected between the lever and casing normally holds the lever against the stop so that the pointer overlies the zero designation of the scale.

In operation a specimen is clamped between the platform and clamp and the piston of the tester is actuated so as to cause the fluid to distend the diaphragm and likewise the specimen. As the specimen is gradually distended or elevated the lever L is likewise elevated towards the dotted line positions shown so as to rotate the pointer P. When the specimen is finally ruptured the pointer overlies some designation of the scale and indicates the extent or degree of elongation of the specimen.

The designations of the scale and the parts may be arranged so that the elongation may be indicated by percentages or by other arbitrary standard of measurement which may be selected.

From the foregoing it will be observed that I have provided means adapted to cooperate with a testing machine which will indicate the amount of elongation of the specimen which takes place while the specimen is being tested by distending it up to a point of rupture. It will also be noted that by employing the elongation indicator in connection with the means for rupturing the paper that it is possible to obtain a reading of the rupturing pressure simultaneously with that of the extent of elongation.

I am aware that many changes may be made in the form of the apparatus to adapt it for various purposes without departing from the spirit and scope of the invention and I prefer therefore to be limited, if at all, by the appended claims rather than by the foregoing description.

What I claim is:

1. A testing machine comprising in combination, an apertured platform and clamp for holding a specimen, a yieldable diaphragm for distending said specimen and means for indicating the extent of the elongation of said specimen including a member for resting on said specimen and which is actuated thereby as the specimen is distended.

2. A testing machine comprising in combination, an apertured specimen platform and an apertured clamp for clamping a specimen to said platform, a yieldable diaphragm for engaging said specimen and elongating it through the apertures of said platform and clamp and an indicator for indicating the elongation of said specimen including a movable lever which is disposed in said apertures so as to overlie said specimen and be actuated thereby.

3. A testing machine comprising in combination, an apertured specimen platform and an apertured clamp for clamping a specimen to said platform, a yieldable fluid actuated diaphragm for engaging said specimen and distending it through the apertures of said platform and clamp, an indicator including a scale and rotatable pointer overlying said scale for indicating the elongation of said specimen and an actuating lever associated therewith having its end disposed within said apertures so as to overlie said specimen and movable thereby as the specimen is distended.

4. A testing machine comprising in combination, an apertured platform and clamp for holding a specimen, a yiedable diaphragm for distending a specimen through the apertures of said platform and clamp, an indicating device for indicating the elongation of a specimen as it is distended and actuated means therefor comprising a movable member arranged to be engaged by and operated by a specimen as it is distended.

JAMES A. COWLEY.